US011196696B2

(12) United States Patent
Nakano et al.

(10) Patent No.: US 11,196,696 B2
(45) Date of Patent: Dec. 7, 2021

(54) DEVICE FOR RESPONSE OPERATION FOR SIGNAL FROM UNSPECIFIED SENDER AND DEVICE FOR RESPONSE OPERATION FOR SIGNAL TO UNSPECIFIED RECEIVER

(71) Applicant: OQTA, INC., Tokyo (JP)

(72) Inventors: Koji Nakano, Tokyo (JP); Kiyohisa Takahashi, Tokyo (JP)

(73) Assignee: OQTA, INC., Tokyo (JP)

( * ) Notice: Subject to any disclaimer, the term of this patent is extended or adjusted under 35 U.S.C. 154(b) by 467 days.

(21) Appl. No.: 16/328,397

(22) PCT Filed: Aug. 26, 2016

(86) PCT No.: PCT/JP2016/074948
§ 371 (c)(1),
(2) Date: Feb. 26, 2019

(87) PCT Pub. No.: WO2018/037550
PCT Pub. Date: Mar. 1, 2018

(65) Prior Publication Data
US 2021/0320894 A1 Oct. 14, 2021

(51) Int. Cl.
*H04L 12/58* (2006.01)
*H04M 19/04* (2006.01)
*H04W 4/08* (2009.01)

(52) U.S. Cl.
CPC .............. *H04L 51/28* (2013.01); *H04L 51/02* (2013.01); *H04M 19/048* (2013.01); *H04W 4/08* (2013.01)

(58) Field of Classification Search
CPC ...... H04L 51/28; H04L 51/02; H04M 19/048; H04W 4/08
See application file for complete search history.

(56) References Cited

U.S. PATENT DOCUMENTS

2012/0063367 A1* 3/2012 Curtis .................. H04W 4/023
370/270
2013/0217365 A1* 8/2013 Ramnani ............... H04L 67/306
455/414.1

FOREIGN PATENT DOCUMENTS

JP  2001283072 A  10/2001
JP  2002149562 A   5/2002
(Continued)

OTHER PUBLICATIONS

International Preliminary Report on Patentability (Chapter II) of corresponding International Application No. PCT/JP2016/074948 dated Feb. 1, 2019; with English-Language translation; 7 pgs.
(Continued)

*Primary Examiner* — Asghar H Bilgrami
(74) *Attorney, Agent, or Firm* — Maier & Maier, PLLC

(57) ABSTRACT

Focusing on the diversity of how people communicate with each other, the objective of the invention is to provide a signal-responsive device that achieves a digital-based method of communicating that has been nonexistent until now. Provided is a signal response operation device which sends, to a receiving device of a receiving subject, signals from a plurality of sending devices for which senders are not specified, and causes the receiving device to operate. A server registers the receiving device of the receiving subject, and groups and registers each sending device of a plurality of the senders which includes persons who have been selected by or have agreed with the receiving subject. By any of the plurality of senders operating the sending devices, the server sends a signal to the receiving device in response to the sending of a signal from the registered sender.

7 Claims, 10 Drawing Sheets

(56) References Cited

FOREIGN PATENT DOCUMENTS

| JP | 2002330175 A | 11/2002 |
| JP | 2004342127 A | 12/2004 |
| JP | 2011-502371 A | 1/2011 |
| JP | 2011145853 A | 7/2011 |
| JP | 2013239853 A | 11/2013 |

OTHER PUBLICATIONS

Translation of International Search Report and Written Opinion dated Nov. 15, 2016 of corresponding International Application No. PCT/JP2016/074948; 6 pgs.
International Preliminary Report on Patentability dated Dec. 27, 2017 of corresponding International Application No. PCT/JP2016/074948; 3 pgs.

* cited by examiner

GROUP ID #00001

| | INTENDED RECEIVER |
|---|---|
| ID | 568115 |
| e-mail | ·····@···· |
| NICK NAME | AB#CD% |
| IMAGE | — |
| PASSWORD | ········ |
| START DATE | 2016/4/10 |
| LAST UPDATED | — |
| AREA | Tokyo |
| SEX | M |
| AGE | 30 |
| OTHER | |

20

| | SENDER #0 | SENDER #1 | SENDER #2 | SENDER #3 |
|---|---|---|---|---|
| ID | 384116 | 385678 | 436179 | 843621 |
| e-mail | ····@···· | ···@···· | ····@···· | ···@···· |
| NICK NAME | EF$G¥H | I#JK&L | M$NO | P%Q¥ |
| IMAGE | — | — | — | — |
| PASSWORD | ········ | ········ | ········ | ······ |
| START DATE | 2016/8/10 | 2016/7/6 | 2014/9/2 | 2016/6/18 |
| LAST UPDATED | — | — | — | — |
| AREA | Kawasaki | Yokohama | Nagasaki | Izu |
| SEX | M | M | M | M |
| AGE | 31 | 32 | 57 | 61 |
| OTHER | | | | |

| | SENDER #4 | SENDER #5 | SENDER #6 | SENDER #7 |
|---|---|---|---|---|
| ID | 344567 | 236549 | 776548 | 316981 |
| e-mail | ····@···· | ···@···· | ····@···· | ····@···· |
| NICK NAME | R&S# | T%$V | W¥X# | Y#Z% |
| IMAGE | — | — | — | — |
| PASSWORD | ······ | ······ | ········ | ······ |
| START DATE | 2016/8/1 | 2013/10/2 | 2015/1/16 | 2016/2/9 |
| LAST UPDATED | — | — | — | — |
| AREA | Nagoya | Nigata | Nara | Osaka |
| SEX | F | F | F | F |
| AGE | 40 | 25 | 20 | 11 |
| OTHER | | | | |

DEVICE FOR RESPONSE OPERATION FOR SIGNAL FROM UNSPECIFIED SENDER AND DEVICE FOR RESPONSE OPERATION FOR SIGNAL TO UNSPECIFIED RECEIVER

FIELD

This invention relates to a device for response operation for signal operable in response to a signal from an unspecified sender and a device for response operation for signal operable in response to a signal from an unspecified receiver.

BACKGROUND

For people's relationships and communications in societies, direct conversations, letters, telephones, telegrams, telexes, facsimiles are used so far as means, and forms of transmissions and receptions of messages through electronic mails, social networking services (SNS) are largely used these days where various communication means such as personal computers, mobile phones, and the Internet are used. Widely used mobile phones change work to send messages to someone, and the mobile phones are able to send electronic mails, text messages of SNS, and pictures and images.

Making communications using devices having excellent usability such as mobile phones brings exact transfer of messages to the receivers, and easily increases information amount to be exchanged by attaching documents and images. As usage of such as, e.g., electronic mails, return mails can be sent without particularly needing any typing of an addressee upon preparing a return mail through manipulating a return button after opening the incoming message, and writing a message to the return mail thus prepared (See generally, Patent Document, Japanese Patent Application Publication, No. 2011-502371).

Communications among people tend to be various, and good correspondence does not necessarily sent a message upon specifying the receiver in a way like the electronic mail. That is, where a message is sent to a mobile phone possessed by the receiver, the receiver is likely forced to return some message, and if no return message is sent, the sender may think the receiver may have some trouble. In a case of senior persons, they can read messages, but it may not be easy for them to return their messages upon forming text through typing.

SUMMARY

It is an object to provide a device for response operation for signal realizing new communication by telecommunication, which does not exist in the past, upon giving an attention to versatility of communications among people.

In consideration of above problems, as a message to be sent to a person, what is to be sent is not necessarily limited to forms of texts and images. For example, in a circumstance of thinking someone or considering someone, a sender may feel only communicating such thinking or feeling of someone simply and not requiring any response, and this invention is to be demonstrated as useful for sending a message effectively even if it is in such a situation.

That is, this invention has a feature of a signal response operation device for a signal from an unspecified sender operating a receiving device by sending, via a server on a communication network, the signal from plural sending devices which make the senders unspecified, to a receiving device possessed by an intended receiver, wherein the server, for forming a group, makes a registration of the receiving device possessed by the intended receiver and makes each registration of the sending devices possessed by the plural senders, respectively, who are selected by or agreed with the intended receiver, wherein the server sends the signal to the receiving device in response to a calling of the signal from the registered sender upon a manipulation of the sending device done by anyone of the plural senders, and wherein the receiving device operates in response to the signal from the server without specifying anyone as the sender.

According to the signal response operation device for a signal from an unspecified sender, the receiving device operates in response to the signal from the server without specifying the sender, so that the intended receiver is not bothered to make a message for return, and can receive the signal from the grouped unspecified senders. That is, if a receiver receives a message where it is apparent who is the sender, its response is likely obligated to some extent, but if the sender is unspecified, and if this communication is mutually understood that the sender is not specified, the contents of the communication can be made sufficient as far as the intended receiver feels activation of the receiving device.

In another structure of this invention, the device has a feature of a signal response operation device for a signal to unspecified receivers, sent from a sending device possessed by a sender via a server on a communication network to plural receiving devices which make the receivers unspecified to operate the receiving devices, wherein the server, for forming a group, makes a registration of the sending device of the sender and makes each registration of the receiving devices of the plural intended receivers, wherein the server sends a signal to the receiving devices in accordance with sending of the signal from the registered sender upon the sender's manipulation of the sending device, and wherein the receiving devices operate in response to the signal from the server.

According to the signal response operation device for a signal to unspecified receivers, the receiving devices operate in response to the signal from the server where the intended receivers are not specified as who are, so that it is suitable for communications in which unspecified many persons are intended receivers. That is, if a receiver receives a message in a form that it is apparent that who is the intended receiver, the sender may wait for response of the message, but if the communications do not specify who is the intended receiver, one way communications from the sending side can be made adequate as the contents of the communications.

BRIEF DESCRIPTION OF THE DRAWINGS

FIG. 2 is a schematic diagram showing memory contents in a memory table of a server of the signal response operation device according to the first embodiment of the invention;

DETAILED DESCRIPTION

Figure 1:
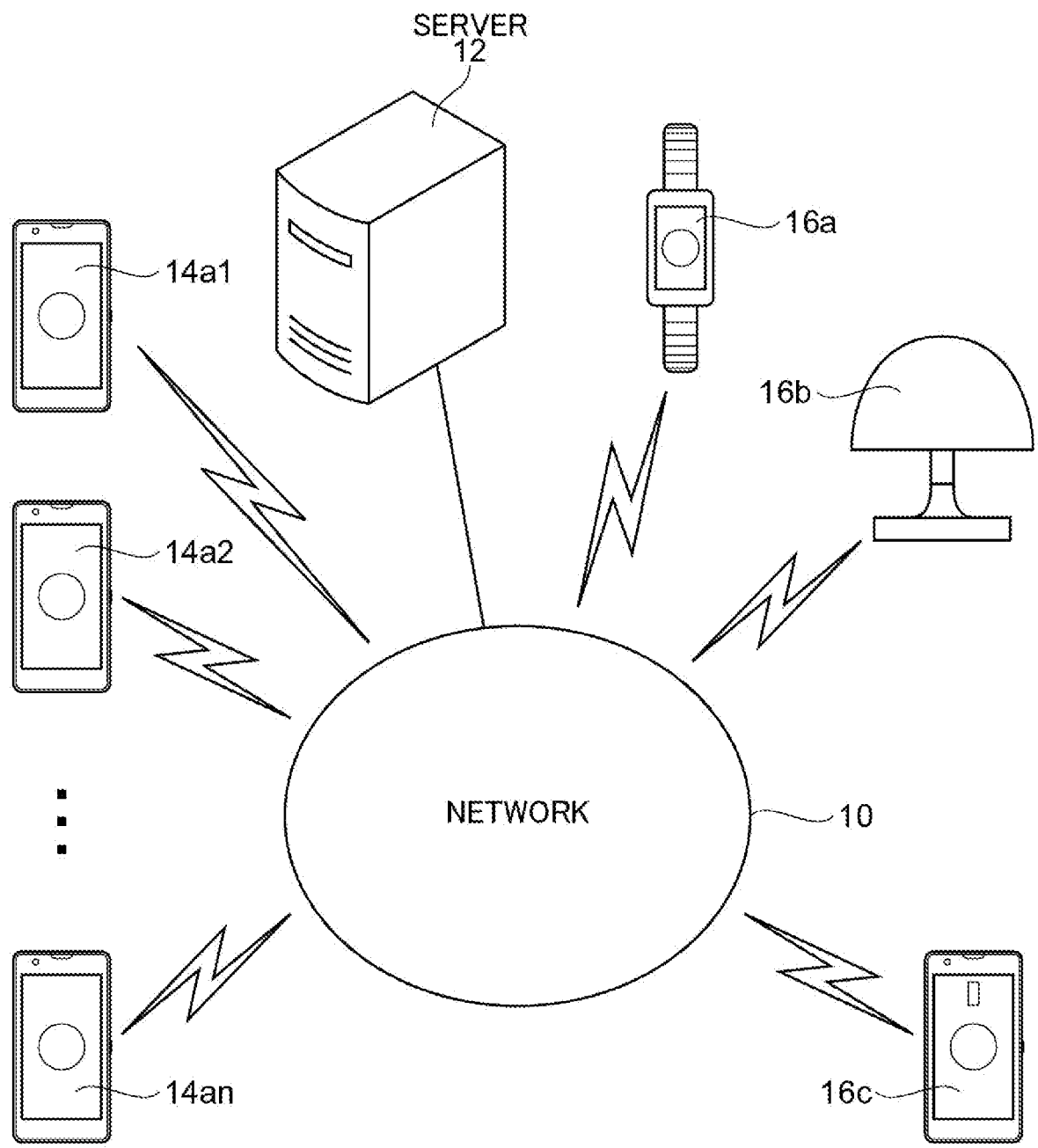
FIG. 1 is a network diagram showing a structure of a signal response operation device according to a first embodiment of the invention.

Referring to the drawings, the signal response operation device according to the invention is described.

First Embodiment

A signal response operation device according to this embodiment includes mobile phones 14a1, 14a2, ..., 14an (n is an integer) respectively serving as sending devices, an electric device 16a serving as a receiving device in a clock shape, and a lamp 16b incorporating a speaker or a mobile phone 16c. Those are connected via a server 12 through a network 10.

The mobile phones 14a1, 14a2, ..., 14an functioning as the sending devices are electronic devices, which are possessed by respective senders of n persons in a plural number and can be manipulated. In this embodiment, the mobile phones are devices respectively acquiring applications by downloading or other means to demonstrate its enhanced function likewise ordinary mobile phones, are installed with a touch panel for smart phone or the like, and are information device terminals installed with an application having browsing functions of contents. The mobile phones 14a1, 14a2, ..., 14an, as far as having an ability to send a signal, can be an electronic device such as, e.g., a tablet terminal, and in this specification, the sending device is defined broadly. The sending device can be a laptop type personal computer, and desktop type personal computer, and can be a program installed as a part of consumer electronic devices or can be a special device for this signal response operation device according to this embodiment. The mobile phones 14a1, 14a2, ..., 14an functioning as sending devices are connected to a broad area network 10 such as the Internet by wireless or wired connection.

The server 12 has the same physical structure as a general personal computer, and includes, e.g., CPU (Central Processing Unit), main memory devices such as RAMs (Random Access Memories), subsidiary memory devices such as HDD (Hard Disc Drive), and telecommunication interfaces. The server 12 can make communications with the mobile phones 14a1, 14a2, ..., 14an functioning as the sending devices via the network 10 using the telecommunication interfaces, and can make communications with any of the clock shaped electric device 16a, the lamp 16b with the built-in speaker, and the mobile phone 16c, which serve as the receiving device, respectively. When the server 12 is turned on, the CPU accesses to the subsidiary memory device to read out the OS (Operating System) and makes a boot upon loading the OS to the main memory device. When executing processing of various types, the server 12 reads applications and data necessary for operation of the signal response operation device according to this embodiment from the subsidiary memory device, and executes them with resources and management from the OS.

In this embodiment, as the device functioning as the receiving device, exemplified are the clock shaped electric device 16a, the lamp 16b with the built-in speaker, and mobile phone 16c, and an intended receiver may use any of those devices. That is, in this embodiment, any of the clock shaped electric device 16a, the lamp 16b, and mobile phone 16c, has a communication function, is connectable to the server 12 via the network 10, and, where the server 12 sends a signal to the receiving device, operates to make a response such as, e.g., making a sound or generating light in real time in response to the signal. For example, the clock shaped electric device 16a includes a small size liquid crystal display panel, a CPU, a main memory device, a subsidiary memory device, and a telecommunication interface, and has functions receiving electronic mails and phone calls. To operate the device functioning as the receiving device of this embodiment, the clock shaped electric device 16a has a structure in which an application for this device is installed and used. In a case where the intended receiver uses the mobile phone 16c, the mobile phone 16c is mounted with a touch panel for such as, e.g., a smart phone, and is an information device terminal having functions of browsing contents and receiving electronic mails and phone calls, in substantially the same manner as where the clock shaped electric device 16a is used. The lamp 16b is in a category different from the information device terminal such as, e.g., the mobile phone 16c, but is an illumination device having a communication function, and is a one type of informational consumer electronics. The lamp 16b can be formed with an information browsing application such as a web browser or with an information display device, but can be formed without those devices or applications. The lamp 16b incorporates at least a speaker, and can make a sound such as a prescribed chime sound when receiving a signal from the server 12. The clock shaped electric device 16a, the lamp 16b, and the mobile phone 16c can receive the signal from the server as push notification, and therefore, can receive the signal at any time with a lower load. In this embodiment, the receiving device used by the intended receiver is described as a single telecommunication device, but the intended receiver may set plural devices as his receiving devices at a time of a registration step as described below.

In the first embodiment, as the device functioning as the receiving device, exemplified are the clock shaped electric device 16a, the lamp 16b, and the mobile phone 16c, but other devices having a telecommunication capability can be used also. A one example is a special terminal having a device communicable with the server 12 and a speaker, which generates a ringtone from the speaker in response to the signal from the server 12 in real time. As another example, the receiving device can be formed by installation, in a form of an application, to various consumer electronics, such as, e.g., microwaves, refrigerators, television sets, air conditioners, air purifiers, pots, and fans. In substantially the same way, the device can generate a ringtone sound from a built-in speaker in response to the signal from the server 12 in the real time. With those examples, the devices can receive the signal as a push notification from the server 12, so that the device can receive the signal at any time with a lower load.

The signal response operation device having the structure thus described according to the this embodiment, needs to register information for making a group to the server 12 of the signal response operation device of the embodiment when used, and the step for registering the group is a precondition for use of the signal response operation device of the embodiment. First, the group includes one person as an intended receiver, and is made of plural persons such that senders who dispatch the signal are n persons or, e.g., eight persons (n=8). After the registration, the sender and the receiver are not replaced with each other, and flow of the signals is substantially the one way direction except signal transmissions of connection establishments and acknowledges. If one person of the senders wants to be an intended receiver, another step for registering a group is required for the intended receiver.

In a typical step for registering a group, a new registration is made by the intended receiver as a center of the group through setting his identification number and password. At a time of the new registration of the intended receiver, information such as his nickname, image, living area, age, and sex can be entered. During the new registration of the intended receiver, a confirmation step using electronic mails is followed, and the server 12 fetches device identification data such as MAC address, and IP address and utilizes those data for the signal transmission during operation. Another important matter at a time that the intended receiver is registered is a step for selecting senders as a basis of sender's invitation step. For example, as a criteria for choosing the senders, a criteria such that "he may think about that person" or that "he may take care of that person" is used. More specifically, with the signal response operation device of the embodiment, because the receiving device does operation without specifying who is the sender according to the signal upon arrival of the signal from the sender to the intended receiver, the operation becomes an one way correspondence in which an event occurrence of the arrival of the signal ends up a completion of series of flows, which is not "thinking" or "care" requiring a return message to the receiving message. The event occurrence of the signal arrival, though not specifying any sender in a view from the intended receiver, results the reception at the intended receiver in real time with effects such that "he or she is thinking about me" or that "he or she is taking care of me," and therefore, the criteria for choosing the senders becomes a choice of such as persons who think about or take care of the intended receiver to make signal dispatch valuable. In particular, it may be chosen from human relations among close relatives or close classmates, and for example, exemplified are human relations such that a parent who is senior and living in a remote area is set to an intended receiver while the senders are, e.g., brothers, sisters, children, and ground children, human relations such that the intended receiver is a husband transferred solely or a family member gone for study abroad while the senders are remaining family members, and further temporary human relations such as those in a business office while a colleague is eventually in a hospital for sick treatment. The step for choosing the senders is performed by registering electronic mails of the planned senders to the server 12, and such a step for choosing the senders may be done by registering telephone numbers or other similar methods.

The planned senders are invited to the group of the signal response operation device of the embodiment in use of electronic mails with respect to the planned senders chosen during the choosing step for the senders. For registering the sender, the identification number and the password is set, and download and installation of application to the device used by the sender can be done, or a method for accessing the server 12 through a browser may be used. At the time of the new registration of the sender, information such as, e.g., his nickname, image, living area, age, and sex can be entered. In this registration of the senders, in substantially the same way as the registration of the intended receiver, a confirmation work is done using the electronic mails, and the server 12 fetches device identification data such as MAC address, IP address to be utilized for signal transmission during operation. All of the chosen senders are not necessarily limited to the persons closely related to the intended receiver or having an intimate distance to the intended receiver to some extent, and it is possible that at least one of the chosen senders is a person who likely sends a signal such that "he may think about the receiver" or "he may care the receiver." It is to be noted that the word "care" is broadly construed, and its meaning includes various feelings such as, e.g., "supporting him" as well as "saying hello?" To the planned senders, each invitation is independently made, though the registration step goes without any relation among the senders, such a registration step may proceed in showing the plural persons chosen as the group.

FIG. 2 shows an example of memory tables 20, 22 stored in the memory device of the server 12 of the signal response operation device of the embodiment. The group registration step as described above can be performed by writing data in the memory tables 20, 22 of the server 12. The memory table 20 is for information of the intended receiver, while the memory table 22 is for information of plural persons, herein e.g., eight senders #0 to #7. Data for device information of the intended receiver and the sender are stored in a portion not shown, and are renewed when needed. In a grouping step, the plural persons, herein e.g., eight senders #0 to #7, are corresponded to the single intended receiver, and therefore, the data in the memory tables 20, 22 in the server 12 are associated with each other.

Figure 3:
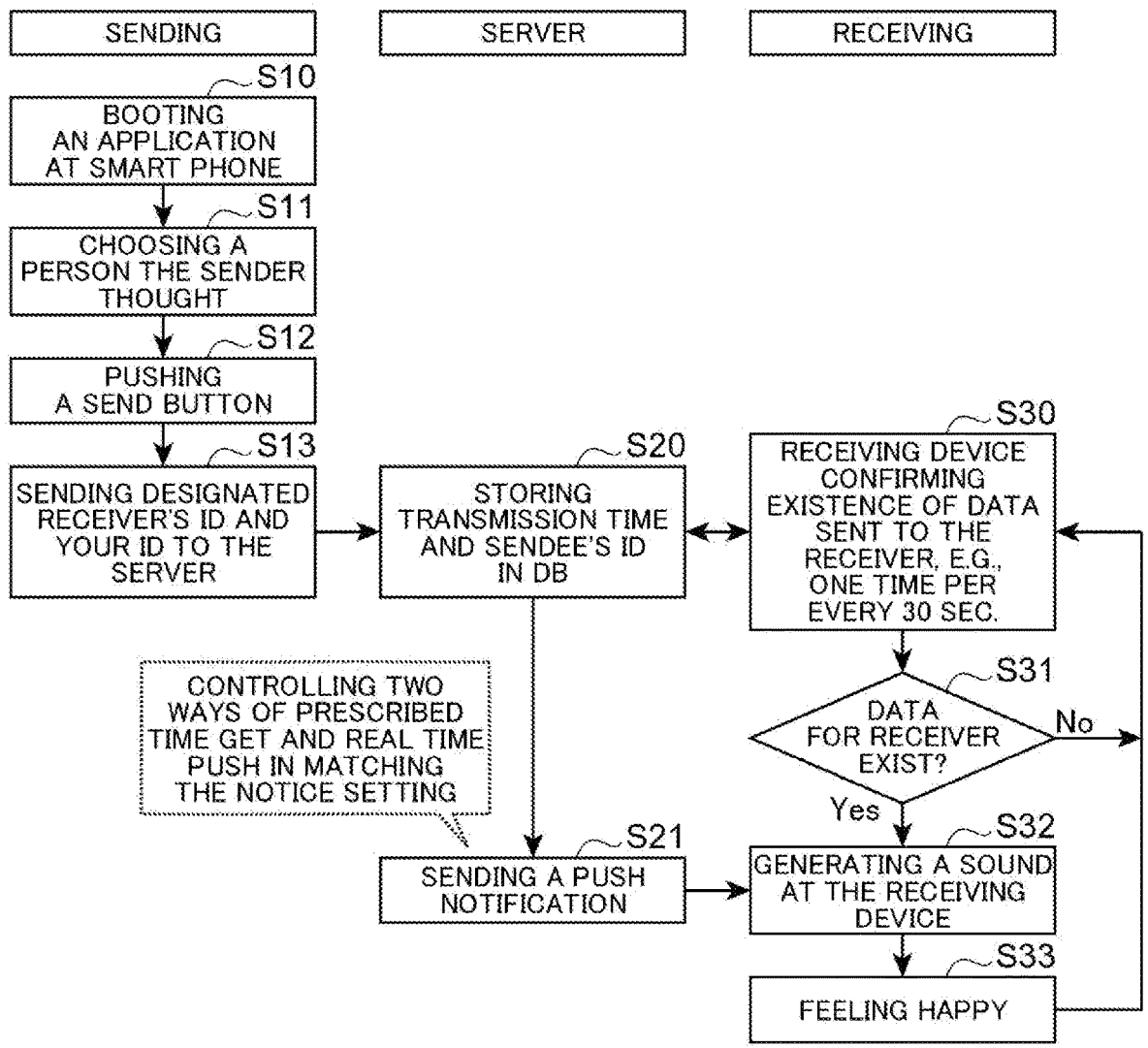
FIG. 3 is a flowchart describing operation of the signal response operation device according to the first embodiment of the invention.

After completion of the group registration step as described above, the user of the signal response operation device of the embodiment can make transmission to the intended receiver according to a flow shown in FIG. 3. First, on the side of the sender, the sending device is a smart phone and boots an application necessary for use of the signal response operation device (Step S10). When the application necessary for use of the signal response operation device is boosted, because already the group registration step is done, a display screen of the smart phone as the sending device shows a picture of the intended receiver, and the smart phone enters into a waiting state for signal transmission. If the sender makes registrations for plural groups, the intended receivers are displayed according to the number of the groups, the user selects any one of the intended receivers (Step S11). The phone displays the send button on the screen together with the picture of the intended receiver.

After entering in the waiting state of the signal transmission upon displaying the picture of the intended receiver, the displayed send button is pushed (Step S12). The signal is sent by pushing the send button. The signal sent from the sending device includes the ID of the intended receiver and his ID as the sender (Step S13). For example, if the sender is the sender #3, the sender sends the signal including the ID of the sender #3. The ID of the intended receiver and his ID as the sender are processed automatically with the application, and the operation by the sender is only to push the send button. A method for pushing the send button is not specifically limited, and for example, a use method may be possible in which the send button is pushed when the sender reminds the intended receiver during his daily life. One of the most effective use methods of the signal response operation device of the embodiment is to use the device by pushing the send button in lieu of thinking for a moment in his mind about the intended receiver as the person in the group related as close relatives and friends.

Where the send button is pushed at the sending device thus formed, the server 12 stores, in the database, at least the address ID of the intended receiver in the signal from the sending device and the sent time (Step S20). From the state that the dispatch of the signal is recorded in the server 12, signals of two types can be sent from the server 12 to the receiving device. One is a push notification from the server 12 (Step S21), and the receiving device receives the push notification from the server 12 and makes a sound (Step S32). Another type transmission method is that, to form a loop of the operation flow, the receiving device makes signals sending to and receiving from the server 12 to confirm as to whether any data sent to the receiving device exist for one time in a period of, e.g., thirty seconds or less (Step S30), and judges existence of the data sent to the receiving device using the resultant data (Step S31), and that, if the data sent to the receiving device exist, the program goes to a step for making a sound at the receiving device (Step S32), or if the data sent to the receiving device do not exist, the program returns to the step to render the receiving device make signals sending to and receiving from the server 12 to confirm as to whether any data sent to the receiving device exist (Step S30). This transmission setting of the two ways can be set on a side of the receiving device, and when necessary, the user can alter or add to the program.

With respect to the sound generated at the receiving device at Step S32, various sounds can be exemplified. For example, in a case of the lamp 16b shown in FIG. 1, which does not require any screen display, the sound may be simply a short sound such as, e.g., a chime sound. In a case of the clock shaped electric device 16a or the mobile phone 16c shown in FIG. 1, a sound may be generated and at the same time, an image can be displayed for reception of the signal. From a technical standpoint at that time, the receiving device can retrieve, as information, whose signal results making the sound, but those receiving devices remain only generating the sound without showing who does transmission. Accordingly, while recognizing someone in the group but unknown specifically who sends the signal, the received intended receiver obtains a feeling that someone is thinking about the receiver at each time when hearing the sound. The received intended receiver is not required to make a return message with respect to the reception of the signal, and can receive the message of "thinking" from the sender in the group by the sound, and therefore elevates the feeling of the intended receiver as shown in the flowchart (Step S33).

With the signal response operation device of the embodiment, though utilizing information technology for sending and receiving messages, the intended receiver is purposely released from social or moral necessity of a return message as usual custom in response to the sent signal by rendering the sender as an unspecified sender. The signal response operation device can be used within the group having a relation such as, e.g., close relatives and friends while a moment feeling such as "thinking about" or "minding" in human's mind is turned into an action of pushing the send button, and is used very easily while its system reduces the load on the user. The signal response operation device can be installed in the existing devices, and can promote new style communications by making grouping.

Second Embodiment

Figure 4:
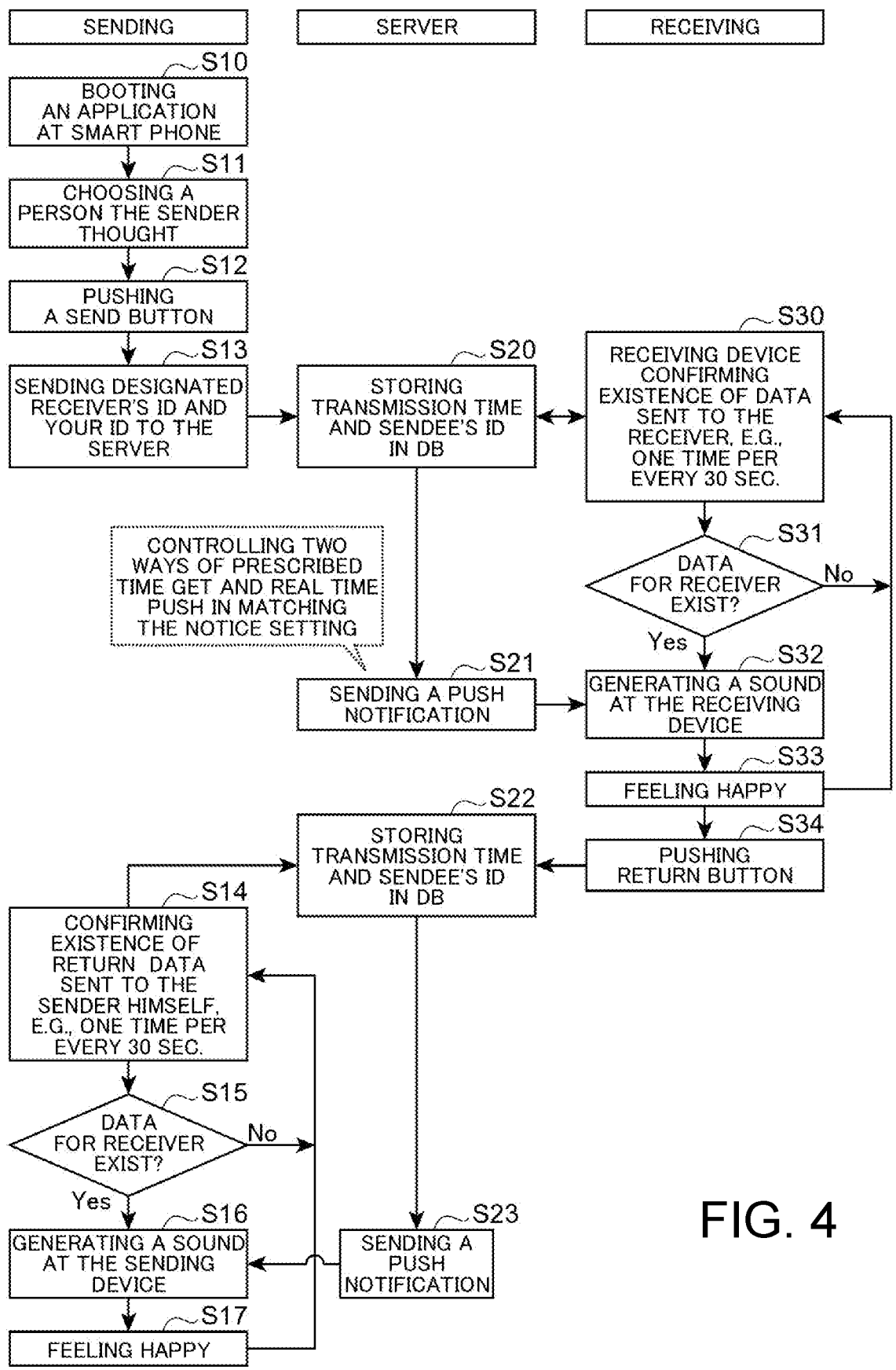
FIG. 4 is a flowchart describing operation of a signal response operation device according to a second embodiment of the invention.

Referring to FIG. 4, operation of the signal response operation device according to the second embodiment of the invention is described. The signal response operation device according to the second embodiment operates in association with "response" from the receiver after the flow of the first embodiment. A description of the duplicated operation of the first embodiment is omitted in the description of the second embodiment in using the same reference numbers, and in the second embodiment, Step S34 for pushing the response button is added after Step S33. That is, the second embodiment is an example in which a response is briefly sent to the sender unspecified from the intended receiver.

As shown in FIG. 4, in the signal response operation device according to the embodiment, when receiving a call, the intended receiver pushes the response button (Step S34). By pushing only the response button, the received intended receiver can make a response, and can respond in making unnecessary any return message, which is likely laborious for production of texts. Because the received intended receiver makes the response without recognizing who is the sender, the intended receiver remains being released from the social necessity of a returning message as usual custom with respect to the send signal, and therefore the signal response operation device can be used very easily, and require a less load on the intended receiver.

If the intended receiver pushes the response button when receiving the signal, a signal is generated, and the information included in the signal is stored in the server 12. More specifically, the server 12 extracts the sender who sends the signal, from the transmission time of the response of the intended receiver and from the ID of the intended receiver. That is, if any relation to the signal sent to the intended receiver is found in the intended receiver's manipulation of the response button, it is deemed as a response to the sender, and the server 12 proceeds response processing. The relation can be found in a case of a short period of time such as, e.g., the manipulation to push the response button is done within two or three hours from the reception at the intended receiver. Where judging that the relation exists, the server 12 stores the sent time and the ID of the sender serving as the addressee in the database. The sender's ID as the addressee is extracted from the ID of the intended receiver when judged as related, and is done by searching the data in the database stored at Step S20.

After the sending sender is extracted, the server 12 can make a response to the sending device with signals of two methods. One is a push notification from the server 12 (Step S23), and the sending device receives the push notification to generate a sound (Step S16). Another signal sending method is that, to constitute a loop of the operation flow, the sending device makes transmissions of signals to and from the sever 12 one time for every thirty seconds to confirm as to whether the response data sent to the sending device exist (Step s14), judges existence of the data sent to the sending device using the result data (Step S15), and proceeds to a step generating a sound at the sending device if the data sent to the sending device exist (Step S16), or returns to the step of making transmissions of signals to and from the server 12 to confirm as to whether the response data sent to the sending device exist if the data sent to the sending device do not exist (Step S14). Those transmission settings of the two methods can be set on the sending device side, and can be modified and added with some change when necessary.

The response sound to be made as a response at the sending device at Step S32 can be various types of the sounds, and for example, the user can choose from simple sound sources such as, e.g., a chime sound to music songs. In this embodiment, those sending devices can receive not a specific individual return message from the received intended receiver but the simple response to the reception of the feeling "thinking about" with a much less load, so that as shown in the flowchart, delightful feeling on the side of the sender can be generated (Step S17).

Third Embodiment

Figure 5:
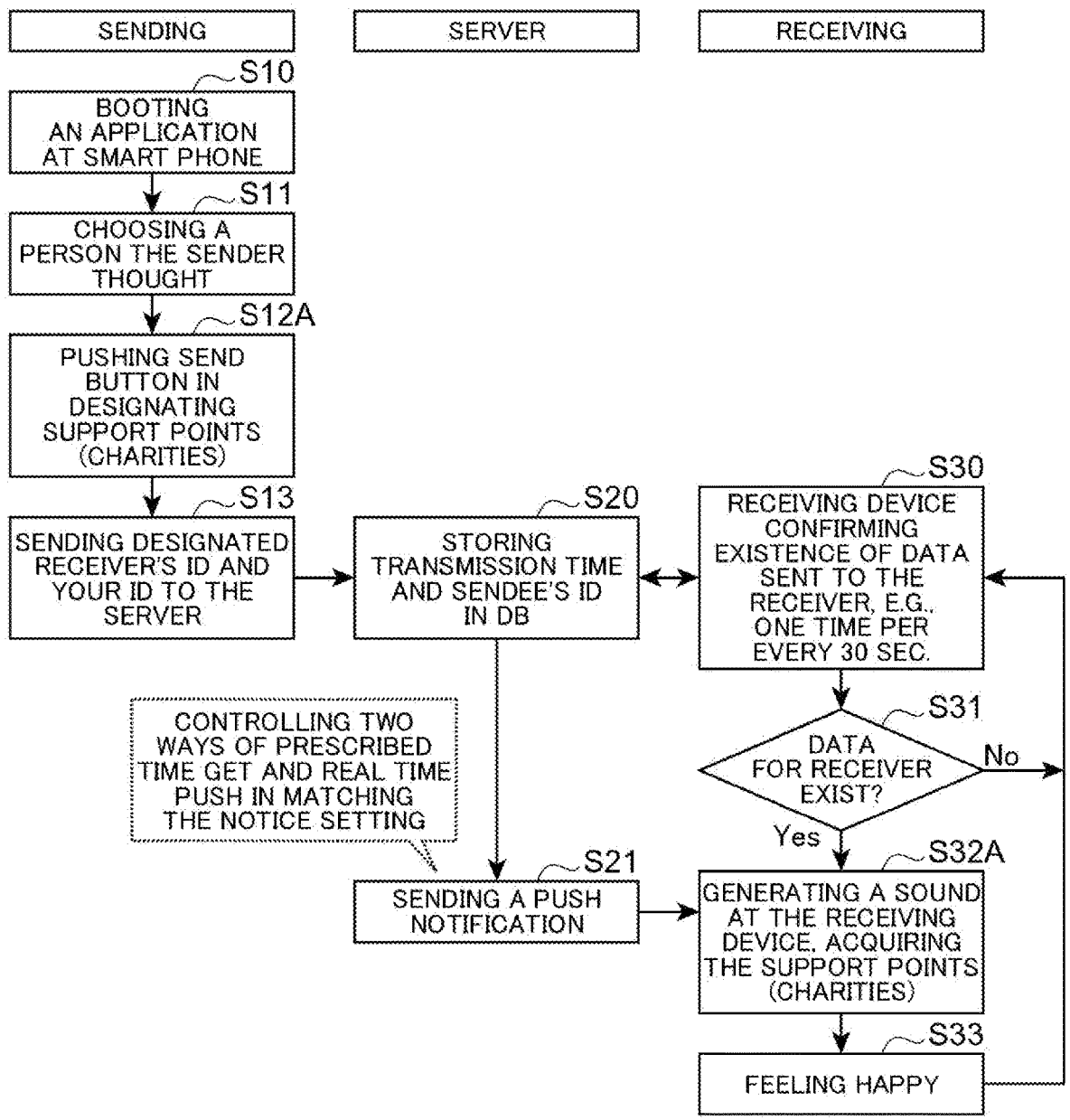
FIG. 5 is a flowchart describing operation of a signal response operation device according to a third embodiment of the invention.

Referring to FIG. 5, operation of the signal response operation device according to the third embodiment of the invention is described. The third embodiment is a device associated with "support points" and "charities" from the sender in a midway of the flow of the first embodiment. A description of the duplicated operation of the first embodiment is omitted in the description of the second embodiment in using the same reference numbers, but in the third embodiment, differences are that the step for pushing the send button at Step S12 is replaced with a step designating support points (Step S12A), and that the step on the intended receiver side is also replaced with a step acquiring the support points (Step S32A).

First, concepts of the "support points (charities)" in the signal response operation device according to the third embodiment are described. The support points (charities) are used in a system of points given at a time when the signal response operation device according to this embodiment is utilized, and any specific example is not described herein, but the system can be a point system mutually usable with the point system for promoting multiple uses such as, e.g., electronic money or shopping, and mileages for airline companies. The "support points (charities)" are points gifted to a target person when the user chooses the target person, and for example, if a user makes a gift of 100 points to a certain person among the intended receivers, the sender who made the gift has his point account with minus 100 points, while the intended receiver who received the gift has his point account with plus 100 points. Those accounts of the points are entirely stored in corresponding to the IDs in the server 12, and the server 12 is used for managing the points.

As shown in FIG. 5, after the sending device is entered into a waiting state of the signal sending upon displaying an image of the intended receiver at Step S11, the user designates the support points (charities) and pushes the displayed send button (Step Sl2A). The designation of the support points (charities) can be done easily by choosing a portion from a pull down menu, not shown, and a confirmation screen may be provided for the support point to be gifted. At Step S13 the signal sent from the sending device includes the ID of the intended receiver and the ID of the person who sends, or namely the sender, and the signal further includes the designated support points (Step S13). It is possible to set the support points (charities) to include various kinds (expiring date existing or not, regular or special type, etc).

On the side of the receiver, by receiving the push notification (Step S21) from the server 12, or by using the loop of the operation flow thus formed (Step S30, S31), a sound is generated at the receiving device (Step S32A). At that time, the support points designated by the sender are given to the signal from the server 12, and in some case, the support points are displayed at the receiving device, and the receiving device may operate as to change tone and type of the sound according to the points or kinds of the support points. At Step S32A, the receiving device does not display who sends the signal but only makes the sound. Accordingly, the received intended receiver definitely obtains feeling of being thought by someone at each time when hearing the sound while being unknown specifically who sends the signal but recognizing the sender is someone in the group. The received intended receiver is not required to make a return message as usual custom in response to the received signal, and receives the feeling of thought from the sender in the group by the sound together with the support points, so that as shown in the flowchart, the intended receiver can have a happy feeling (Step S33).

Fourth Embodiment

Figure 6:
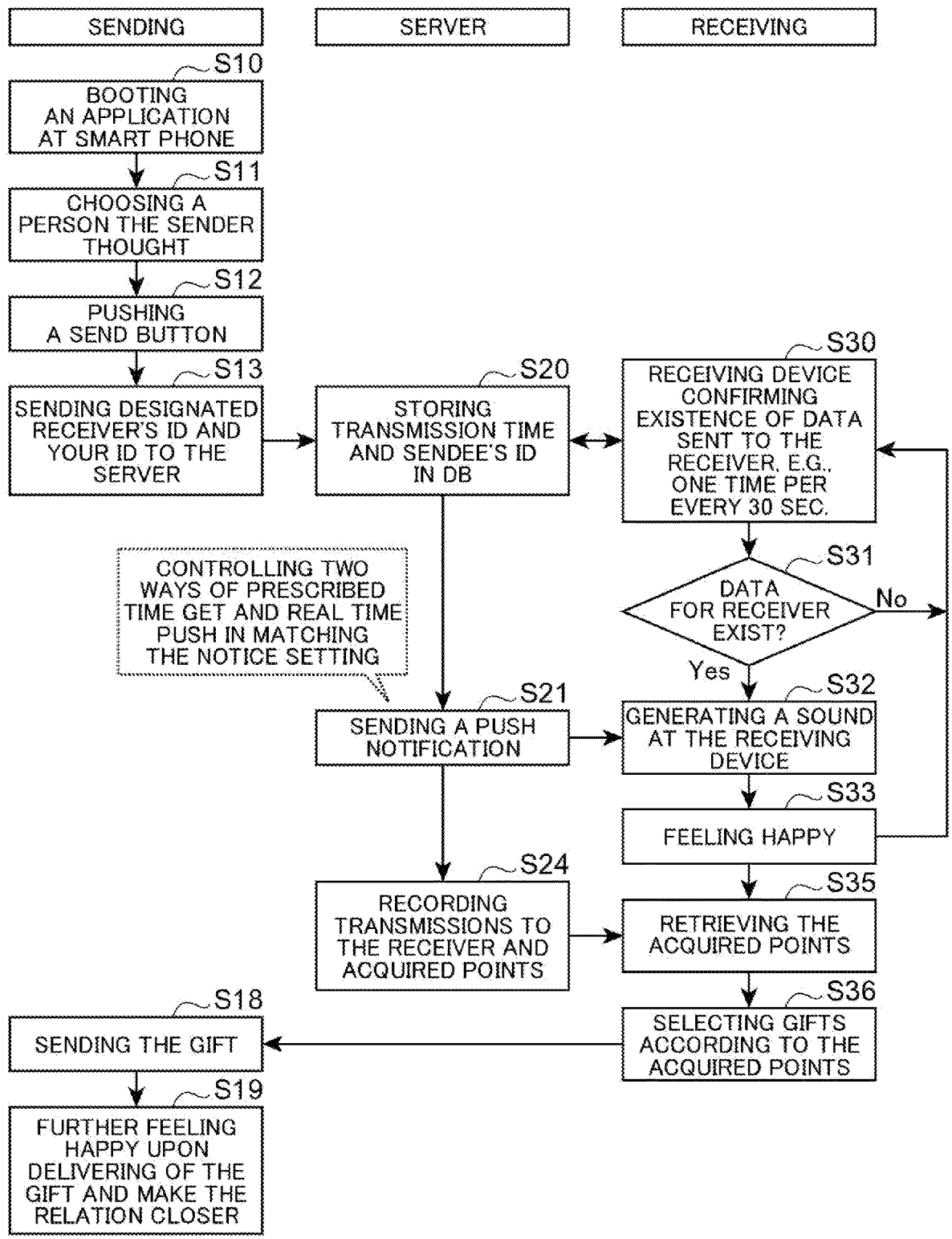
FIG. 6 is a flowchart describing operation of a signal response operation device according to a fourth embodiment of the invention.

Referring to FIG. 6, operation of the signal response operation device according to the fourth embodiment of the invention is described. In the operation of the signal response operation device according to the fourth embodiment, in addition to the operation of the signal response operation device according to the first embodiment, used is a system in which the points of the intended receiver are managed by the server 12, and in which a present is sent according to the acquired points. That is, a push notification (Step S21) sent from the server 12 further includes information on the points of the intended receiver, and the server 12 makes recordings of the transmission to the intended receiver and the required points (Step S24), and the information on the acquired points is provided to the receiving device (S35). For example, if the intended receiver has a phone such as a smart phone with a displaying function, the server 12 renders the phone display the acquired point information, and if the intended receiver uses a device not having a display screen such as, e.g., lamp 16b, the system can prepare a button to change the tone according to the acquired points or announce the acquired points by voice. The system also can be set in accessing the server 12 through other personal computers or other electronic devices in use of the login ID and password to display the acquired points.

Next, the intended receiver, with respect to the acquired points, can choose some gift (Step S36). Exemplified as selectable gifts are, not limited to, but e.g., any goods or cash voucher circulated as foods, beverages, accessories, and gifts, or any items contributed to use of electronic devices, such as wallpapers and stamps. At the time choosing the gift, the user sets the sendee of the gift. The sendee of the gift may include himself (intended receiver), and may include the senders, and any other persons, and for example, by login in use of the login ID and password, it can be entered easily in the server 12. A typical sendee of the gift is set from an entry of an item "Sender Thinking You Most," and the intended receiver can send the gift without specifically knowing who is the sender thinking about the intended receiver most.

Based on the kind of the gift and the sendee data stored in the server 12, the prescribed gift is delivered to the sendee (Step S18), and when the gift is delivered, the sendee feels happy (Step S19). At that time, if the sendee of the gift is the sender, the relation can be further strengthened by delivering the gift to the sender (Step S19). In this embodiment, the received intended receiver can perform a work for sending the gift via the server 12 without needing any return message as custom to the sent signal, so that it is very useful to strength the relation between humans.

Fifth Embodiment

The fifth embodiment of the invention is an embodiment having a sending and receiving relation opposing to those in the first to fourth embodiments described above. This embodiment is an example in which a signal or signals are sent individually or all at once to plural receivers in the group from a specific sender.

Figure 7:
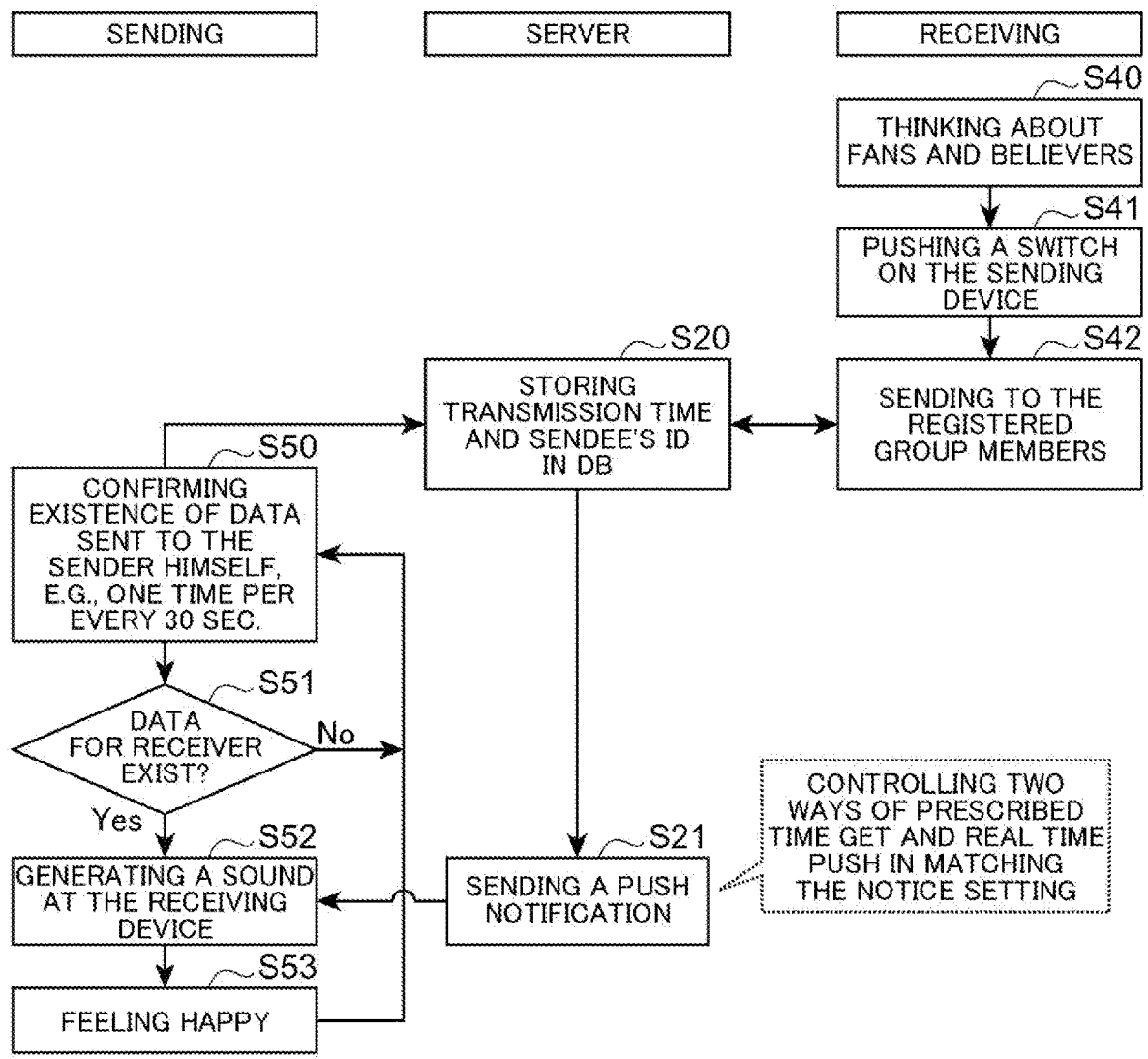
FIG. 7 is a flowchart describing operation of a signal response operation device according to a fifth embodiment of the invention.

In the fifth embodiment, group member registrations are made before the operation shown in FIG. 7 begins. A typical use of the embodiment fits for a membership registration such as, e.g., a fan club with respect to a particular person or a group of plural persons, and may fit for a relation of believers with respect to a guru in a religious group. In this embodiment, it is effective for a relation in which a message from a specific certain person is beneficial to plural persons or receivers who receive the message, but this is not construed to exclude other applications for other relations, and this embodiment is applicable broadly.

Herein, a certain entertainer, athlete, or guru is registered first as a sender, and for the group registration work, many members such as, e.g., fan club members or believers to the guru, are registered as receivers. As a viewpoint from the sender, individual human relations are not necessary for each member, and respective return messages from the receivers to the sender are hopefully not required in consideration of, such as, e.g., the responses to the messages. With respect to this point, the signal response operation device according to this embodiment has a structure most suitable for use. The group registration work is substantially the same as described in the first embodiment, and a new registration can be made respectively by the receiver to set his ID and password. During this registration of the receiver, information such as, e.g., his own nickname, image, living area, age, sex can be entered. During the new registration of the receiver, a confirmation step using electronic mails is followed, and the server 12 fetches device identification data such as MAC address, and IP address and utilizes those data for the signal transmission during the operation. Such ID registrations are made for the senders, and as far as the server 12 can recognize, any arbitrary electronic devices can be registered as sending devices of the senders.

As described above, after the server 12 stores the information of the registrations of the member system as the group registration, the sender dispatches signal sending as shown in FIG. 7. More specifically, the sender thinks about his fans or believers (Step S40), and the sender uses the sending device and pushes the switch in response to a movement in the feeling (Step S42), thereby sending a signal to the members who are registered as the group. The transmission to the members can be done all at once, but also can be done individually. For example, the signal can be sent by selecting some persons among the plural registered receivers.

In response to such signal transmission, the server 12 stores in its database at least the addressee ID of the receivers and the sent time from the signals from the sending devices (Step S20). Where the server 12 is in a state recording the signal sending, two kind signals can be sent to the receiving devices from the server 12 in substantially the same manner as in the first embodiment. One is a push notification from the server 12 (Step S21), and the receiving device receives the push notification from the server 12 and makes a sound (Step S52). Another type transmission method is that, to form a loop of the operation flow, the receiving device makes signals sending to and receiving from the server 12 to confirm as to whether any data sent to the receiving device exist for one time in a period of thirty seconds (Step S50), and judges existence of the data sent to the receiving device using the resultant data (Step S51), and that, if the data sent to the receiving device exist, the program goes to a step for making a sound at the receiving device (Step S52), or if the data sent to the receiving device do not exist, the program returns to the step to render the receiving device make signals sending to and receiving from the server 12 to confirm as to whether any data sent to the receiving device exist (Step S50). This transmission setting of the two ways can be set on a side of the receiving device, and when necessary, the user can alter or add to the program.

With respect to the sound generated at the receiving device at Step S52, various sounds can be exemplified. For example, the sound can be a reproduction of a voice file special to the sender, including, e.g., thankful messages to the plural fan club members, or a melody or theme song particular to the sender, and those sounds can be replaced with other sounds during the period and can be downloaded. In this embodiment, those receiving devices only generates sounds, so that the receivers can receive "thinking" from the sender by way of the sounds without needing any return message as custom to the reception of the signal, and as shown in the flowchart, the receiver can feel happy (Step S53).

Sixth Embodiment

The sixth embodiment of the invention is an embodiment in which senders in an unspecified number send signals to receivers in an unspecified number, and in which the receiving devices operate generating a sound or carrying out special images or movies upon doing special and automatic matching from factors such as, e.g., position information, profile, hobbies, and time. In this embodiment, making a group is possible by a registration step for the group, but such a group registration step is not necessary, and grouping can be made by downloading a necessary application. An application for each event such as, e.g., an application for Anywhere-Town firework, festival 2016 August, may be prepared.

Figure 8:
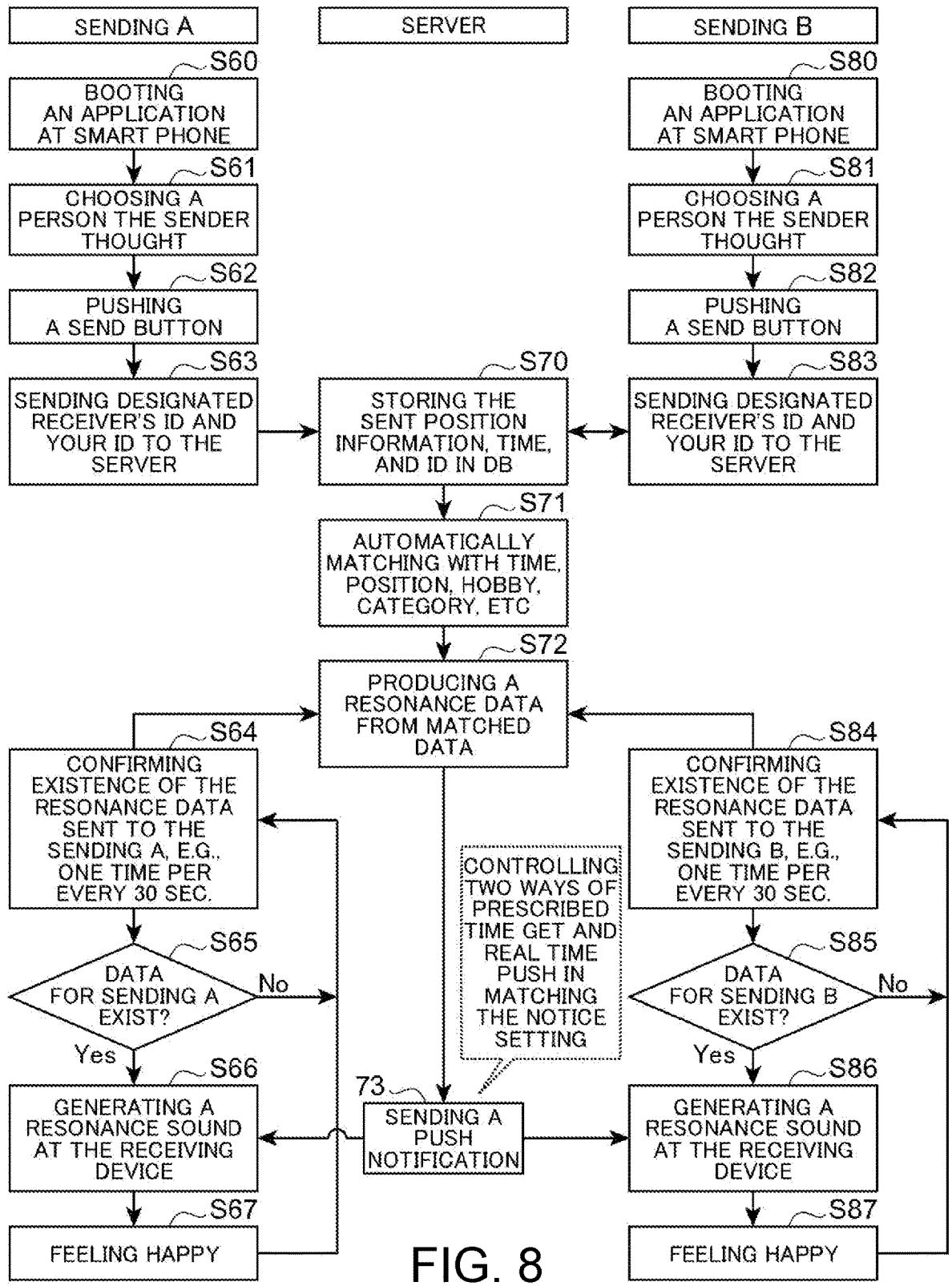
FIG. 8 is a flowchart describing operation of a signal response operation device according to a sixth embodiment of the invention.

As one of the use method of the signal response operation device according to the embodiment, exemplified is a use method in which a signal is sent where the sender is unspecified among the users of the application, to provide only information of existence to the receivers. As shown in FIG. 8, in this embodiment, two unspecified number groups of senders and receivers conducting matching exist, and for example, sending A group and sending B group exist. Those groups are set according to information entry at a time of the registration when boosting the application, and the group registration step as described above is not required. That is, the step for boosting the application also serves for the registration step for making groups. The sending A group is a group that would like to make a greeting to women in the generation of thirties who love movies according to hobbies, age, and sex information, while the sending B group is a group of women in the generation of thirties who love movies according to hobbies, age, and sex information. In supposing that those people of each of the A group and the B group come close at a place or an event area where many people get together (hereinafter referred to as "place C"), the people in sending A group enter in a state sending a signal according to the operation from Step S60 to Step S63, whereas the people in sending B group enter in a state sending a signal according to the operation from Step S80 to Step S83. It is to be noted that the flows from Step S60 to Step S63 and from Step S80 to Step S83 are substantially the same as that from Step S10 to Step S13, and the signal sent to the server 12 is sent in including the GPS information as the position information of the senders. The meaning of signal sending is their "feeling" that they would like to make a greeting on the sender A side, and is presentation of intention for accepting such a greeting on the sender B side.

At the server 12 receiving such a signal, first the database (see FIG. 2) stores the sent position information, time, and ID (Step S70). After the database stores the data once, the server 12 does matching with times, positions, hobbies, categories (sex, age, area, and other profile) (Step S71). On the sender A side, data of the greeting target persons such as, e.g., "love movies, thirties, female, place C (position information), real time" are sent to the program processing the matching sequentially, while on the sender B side, data of the persons themselves such as, e.g., "love movies, thirties, female, place C (position information), real time to 5 min" are sent to the program processing the matching sequentially. The program processing the matching produces resonance data from an overlapping degree between the data (Step S72). The resonance data means data produced when matching between the data is found, and are data with a setting making a resonance sound, which is different from the regular ringtone. No resonance data is produced when no matching between the data is found.

Where the resonance data is produced at the server 12, the server 12 can send signals of two types to the receiving devices. One is a push notification from the server 12 (Step S73), and the receiving devices receiving the push notification from the server 12 are rendered to make the special resonance sound (Step S66, S86). Another sending method is for forming a loop of an operation flow including performing with the server 12 sending and receiving signals at the sending device for confirming whether the resonance data sent to the receiving device exist one time per thirty seconds (Steps S64, S84), judging, using the resultant data, as to whether the data sent to the receiving devices exist (Steps S65, S85), proceeding to a step for making the resonance sound at the receiving device if the data sent to the receiving device exist (Steps S66. S86), and returning to a step performing with the server 12 sending and receiving signals at the sending device for confirming whether the data sent to the receiving device exist (Steps S64. S84) if the data sent to the receiving device do not exist. These transmission settings of the two methods can be set on a side of the receiving device, and can be altered and added when necessary.

The receiving receiver can receive "feeling" from the unspecified senders by the sound in a form of the resonance sound without needing any customary return message with respect to the call reception, and as shown in the flowchart, the receivers can be delighted (Steps S67, S87).

Figure 9:
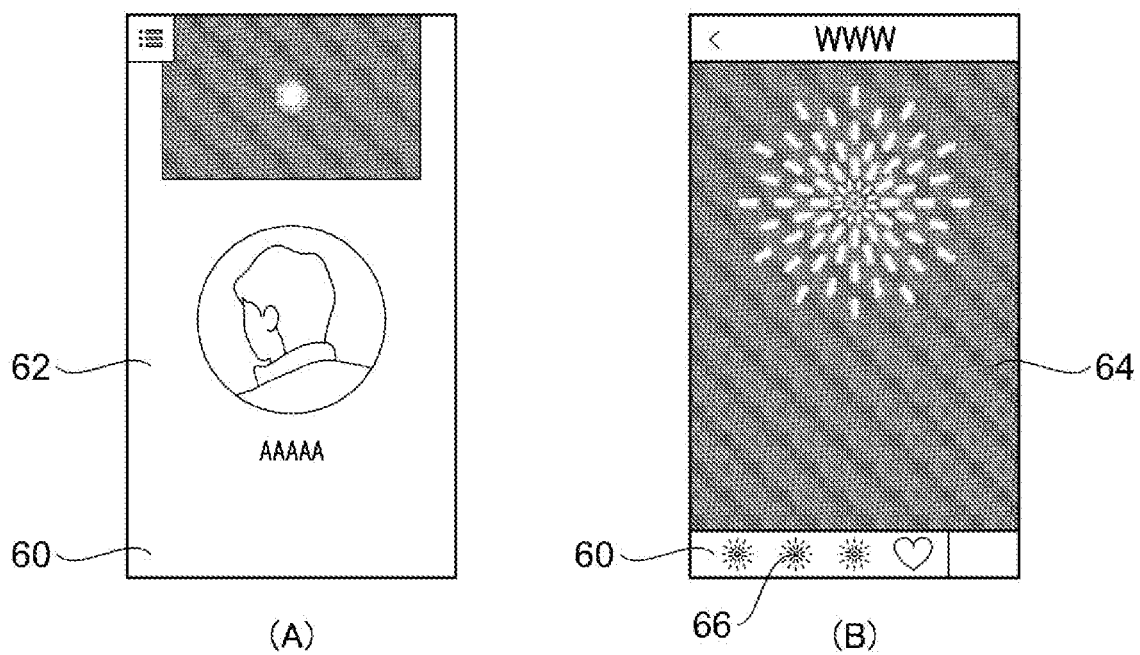
FIG. 9 is a schematic diagram showing sending and receiving devices of the signal response operation device according to the sixth embodiment of the invention.

A using method in which, between the users of the application, a signal is sent where the sender is unspecified to render only existence transmitted to the opponent, as one of the use forms of the signal response operation device according to the embodiment, is applicable to making a cascading operation based on matching of the position information. FIG. 9 shows an example in which an application such that the smart phones 60 are sending and receiving devices is installed for an event such as a firework festival; (A) on the left side in FIG. 9 shows a state that the smart phone 60 displays a waiting screen 62; and (B) on the right side in FIG. 9 shows a state that the smart phone 60 receives a call. To produce a cascade state in the unspecified users, the information stored in the database of the server 12 includes the position information using the GPS function and the time information of the smart phone 60. If those are matched, the smart phone 60 serving as the receiving device displays e.g., a firework on its screen 64. While the firework is on the screen 64, and if a button 66 arranged at a lower portion is pushed down, a signal is transmitted from the receiving device to be further received by several other smart phones running the same application and being located within a predetermined distance, thereby rending the several smart phones display the firework on their screen in substantially the same manner. By repeating those steps for sending and receiving the signals, plural number of the smart phones operate in the cascade manner, thereby rendering the phones display the firework on their screens and generate a predetermined launching sound of the firework.

Figure 10:
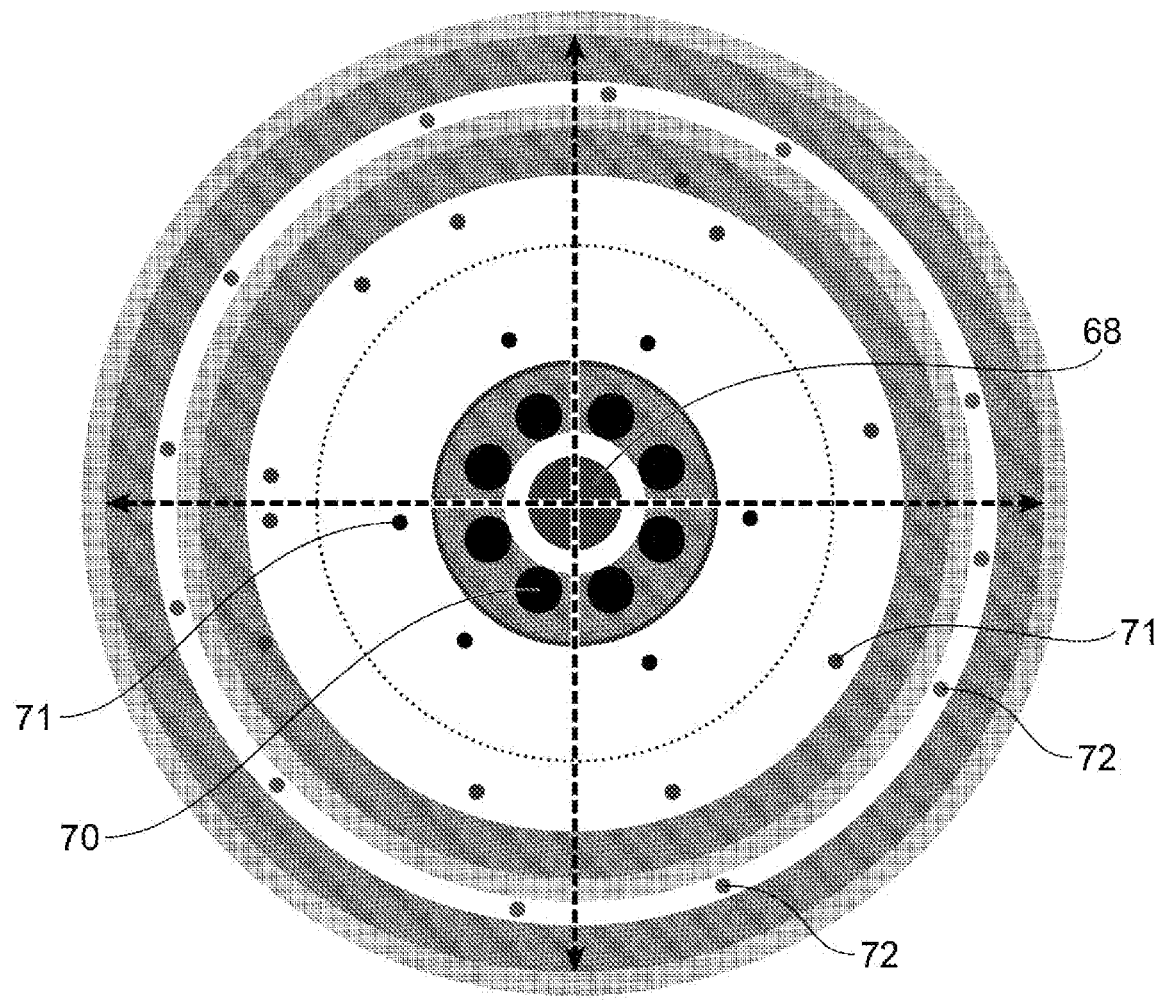
FIG. 10 is a schematic diagram describing cascading operation of the signal response operation devices according to the sixth embodiment of the invention.

FIG. 10 is a schematic diagram illustration such cascading operation of the plural smart phones. Each of plural people who get together at a specific location for a firework festival is asked to make a download of an application for the event titled with such as, e.g., Anywere Town firework festival, 2016, August and to prepare the operation upon downloading. As an ideal firework cascading operation, a certain smart phone 68 at an initial point initiates the operation to make a primary firework launching operation at the smart phones 70 held at persons located near to the initial point among persons who get together at that location, and if the holders of the smart phones 70 performing the primary firework launching operation, push a return message button 66 arranged at a lower portion as a return message to the incoming call, secondary smart phones 71 located near to the phones 70 receive signals to operate displaying the firework launching operation. Further, the holders of the secondary smart phones 71 repeat substantially the same operation to enhance the range gradually with other smart phones located further outside, and this operation is done in a repetitive manner, thereby finally operating even smart phones 72 located at the outmost position.

Such extension of the ring of the cascading operations requires an associated relation among the holders of the smart phones 68 to 72, and existence of the association decides whether the cascade operation becomes larger. For example, if the many people are associated, outputting special sounds or screens may be set, and because such an operation does not automatically enhance the range, it contributes, e.g., elevation of attendee's motivations in the event place.

To realize the cascade operation like the firework in FIG. 10, cooperation of many unspecified people may be needed. For a person who initiates launching the firework, a special person such as a sponsor of the event, or a specially treated person such as a meritorious person may serve. A system may be used in which a special right such as a token may be circulated in time or in which a prize winner may be selected. The range of areal extensions may be a distance such as, e.g., several hundred meters or five or ten kilometers, or can be set as a geographical range such as within a city or prefecture. Those setting can be set by adjusting the program in the server 12.

As described above, with the signal response operation device according to the embodiment, the unspecified senders of a plural number can send a signal or signals to the unspecified receivers of a plural number, and the receivers can send a signal or signals to the opponents as being unspecified or make a return message.

According to the above mentioned embodiments, the receiving devices and the sending devices are illustrated as the devices making sounds, but are not limited to them. Those devices can generate light, smell, or gas, or activate the whole or part of the devices, or can be arranged to operate combinations of the sounds and those actions.

What is claimed is:

1. A signal response operation device comprising:
a signal from an unspecified sender operating a receiving device by sending, via a server on a communication network, the signal from plural sending devices which make the senders unspecified, to a receiving device possessed by an intended receiver,
   wherein the server, for forming a group, makes a registration of the receiving device possessed by the intended receiver and makes each registration of the sending devices possessed by the plural senders, respectively, who are selected by or agreed with the intended receiver,
   wherein the server makes a push notification of the signal to the receiving device to render the receiving device operate to make a sound, to generate a light, to generate a smell, to move the whole or a part of the device, to generate a gas, or to perform any combination of those, in response to a calling of the signal from the registered sender upon a manipulation of the sending device done by anyone of the plural senders; and
   wherein the receiving device operates in response to the signal from the server without specifying anyone as the sender.

2. The signal response operation device for a signal from an unspecified sender according to claim 1, wherein the registrations of the receiving device and the sending devices are made by registering respective electronic mail addresses.

3. The signal response operation device for a signal from an unspecified sender according to claim 1, wherein the receiving device includes a return control section for outputting a return signal, and wherein, after the receiving device operates, the intended receiver manipulates the return control section of the receiving device to send the return signal to the sending device of the sender via the server from the receiving device.

4. The signal response operation device for a signal from an unspecified sender according to claim 1, wherein the server provides and stores points with respect to the receiving device operating or to be operated, and wherein the stored points are interchangeable with other items according to the stored points.

5. A signal response operation device comprising:
a signal to unspecified receivers, sent from a sending device possessed by a sender via a server on a communication network to plural receiving devices which make the receivers unspecified to operate the receiving devices,
   wherein the server, for forming a group, makes a registration of the sending device of the sender and makes each registration of the receiving devices of the plural intended receivers,
wherein the server makes a push notification of a signal to the receiving devices to render the receiving device operate to make a sound, to generate a light, to generate a smell, to move the whole or a part of the device, to generate a gas, or to perform any combination of those, in accordance with sending of the signal from the registered sender upon the sender's manipulation of the sending device; and
   wherein the receiving devices operate in response to the signal from the server.

6. The signal response operation device for a signal to unspecified receivers according to claim 5, wherein the server, for forming a group, makes a registration of one sending device of a single sender.

7. The signal response operation device for a signal to unspecified receivers according to claim 5, wherein the server, for forming a group, makes each registration of the sending devices of the plural senders.

* * * * *